United States Patent
Beaulieu et al.

(10) Patent No.: US 11,944,929 B2
(45) Date of Patent: Apr. 2, 2024

(54) FILTER ASSEMBLY FOR GAS TURBINE ENGINE

(71) Applicant: PRATT & WHITNEY CANADA CORP., Longueuil (CA)

(72) Inventors: Rose Beaulieu, Verdun (CA); Pierre Gauvin, St-Bruno-de-Montarville (CA); Louis Brillon, Varennes (CA); Joanna Radon, Rakszawa (PL); Sean Powers, Candiac (CA); Kevin White, Montreal-Nord (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 35 days.

(21) Appl. No.: 17/804,132

(22) Filed: May 26, 2022

(65) Prior Publication Data

US 2022/0280892 A1    Sep. 8, 2022

Related U.S. Application Data

(63) Continuation of application No. 16/778,443, filed on Jan. 31, 2020, now Pat. No. 11,369,908.

(51) Int. Cl.
*B01D 46/00* (2022.01)
*B01D 46/24* (2006.01)

(52) U.S. Cl.
CPC ...... *B01D 46/0005* (2013.01); *B01D 46/2411* (2013.01); *B01D 46/0004* (2013.01);
(Continued)

(58) Field of Classification Search
CPC ............ B01D 46/2411; B01D 46/2414; B01D 35/30; B01D 2201/301; B01D 2201/302;
(Continued)

(56) References Cited

U.S. PATENT DOCUMENTS 2,463,800 A    3/1949  Pate
4,322,231 A    3/1982  Hilzendeger et al.
(Continued)

FOREIGN PATENT DOCUMENTS

DE    102015208426 A1    11/2016
EP    1304244 A2    4/2003
(Continued)

OTHER PUBLICATIONS

European Search Report issued in counterpart application 22167666.1 dated Jun. 28, 2022.
(Continued)

*Primary Examiner* — Robert Clemente
(74) *Attorney, Agent, or Firm* — NORTON ROSE FULBRIGHT CANADA LLP.

(57) ABSTRACT

A filter housing for containing a cartridge assembly having a filter cartridge secured to a filter cover, the filter housing has a peripheral wall extending around a longitudinal axis, and end wall secured to the peripheral wall, the filter housing defining a cavity partially enclosed by the peripheral wall and the end wall, the peripheral wall defining a cartridge-receiving section extending from the end wall along the longitudinal axis and sized for receiving the filter cartridge and a cover-receiving section extending along the longitudinal axis from the cartridge-receiving section to an open end of the filter housing opposed to the end wall and sized for receiving the filter cover, a portion of the cover-receiving section recessed radially outwardly from the cartridge-receiving section relative to the longitudinal axis, a lubricant outlet of the filter housing extending through the portion of the cover-receiving section of the peripheral wall.

17 Claims, 9 Drawing Sheets

(52) U.S. Cl.
CPC .... *B01D 2201/302* (2013.01); *B01D 2201/34* (2013.01); *B01D 2265/028* (2013.01); *B01D 2271/027* (2013.01); *B01D 2279/60* (2013.01)

(58) Field of Classification Search
CPC .......... B01D 2201/34; B01D 2271/027; B01D 2201/291
See application file for complete search history.

(56) References Cited

U.S. PATENT DOCUMENTS

| | | |
|---|---|---|
| 4,536,200 A | 8/1985 | Reist |
| 4,707,165 A | 11/1987 | Tauber et al. |
| 5,531,129 A | 7/1996 | Thornton et al. |
| 6,149,703 A | 11/2000 | Parker |
| 6,217,755 B1 | 4/2001 | Stifelman et al. |
| 6,398,833 B1 | 6/2002 | Santerre et al. |
| 6,533,845 B2 | 3/2003 | Tokar et al. |
| 6,540,914 B1 | 4/2003 | Smith |
| 6,991,665 B1 | 1/2006 | Allen et al. |
| 7,396,376 B2 | 7/2008 | Schrage et al. |
| 8,114,196 B2 | 2/2012 | Lamee |
| 8,226,822 B2 | 7/2012 | Paradise |
| 8,357,219 B2 | 1/2013 | Boehrs et al. |
| 8,545,589 B2 | 10/2013 | Rocklitz et al. |
| 8,734,572 B2 | 5/2014 | Zhang et al. |
| 8,845,898 B2 | 9/2014 | DeDe et al. |
| 8,973,760 B2 | 3/2015 | Ries et al. |
| 9,308,483 B2 | 4/2016 | Jackson et al. |
| 9,446,333 B2 | 9/2016 | Vercammen |
| 9,782,702 B2 | 10/2017 | Carrion |
| 10,024,239 B2 | 7/2018 | Turcotte |
| 10,201,772 B2 | 2/2019 | Allott et al. |
| 10,247,102 B2 | 4/2019 | Dreher et al. |
| 10,337,600 B2 | 7/2019 | Ture |
| 10,512,865 B2 | 12/2019 | Eyers et al. |
| 2004/0164009 A1 | 4/2004 | Smith |
| 2005/0252848 A1 | 11/2005 | Miller |
| 2009/0071111 A1 | 3/2009 | Lundgren |
| 2011/0277442 A1 | 11/2011 | Drobniak |
| 2012/0240535 A1 | 9/2012 | Mann et al. |
| 2014/0150388 A1 | 6/2014 | Girondi et al. |
| 2016/0184744 A1 | 6/2016 | Jakop et al. |
| 2019/0046907 A1 | 2/2019 | Willems |
| 2019/0134546 A1* | 5/2019 | Neef .................. B01D 46/0005 |
| 2019/0308123 A1* | 10/2019 | Neef .................. B01D 46/0045 |
| 2019/0308124 A1* | 10/2019 | Neef ................. F02M 35/02433 |
| 2019/0308125 A1* | 10/2019 | Neef .................. F02M 35/0201 |
| 2019/0308126 A1* | 10/2019 | Fritzsching ........ F02M 35/0245 |
| 2019/0345853 A1 | 11/2019 | Stachowiak |

FOREIGN PATENT DOCUMENTS

| | | |
|---|---|---|
| EP | 2451556 A1 | 5/2012 |
| WO | WO02/100511 A1 | 12/2002 |
| WO | WO03/082435 A1 | 10/2003 |
| WO | WO2008/030707 A1 | 3/2008 |
| WO | 2015153906 A2 | 10/2015 |
| WO | WO2017/050368 A1 | 3/2017 |
| WO | WO2017/050369 A1 | 3/2017 |

OTHER PUBLICATIONS

European Search Report issued in counterpart application No. 21154429.1 dated Mar. 15, 2021.

* cited by examiner

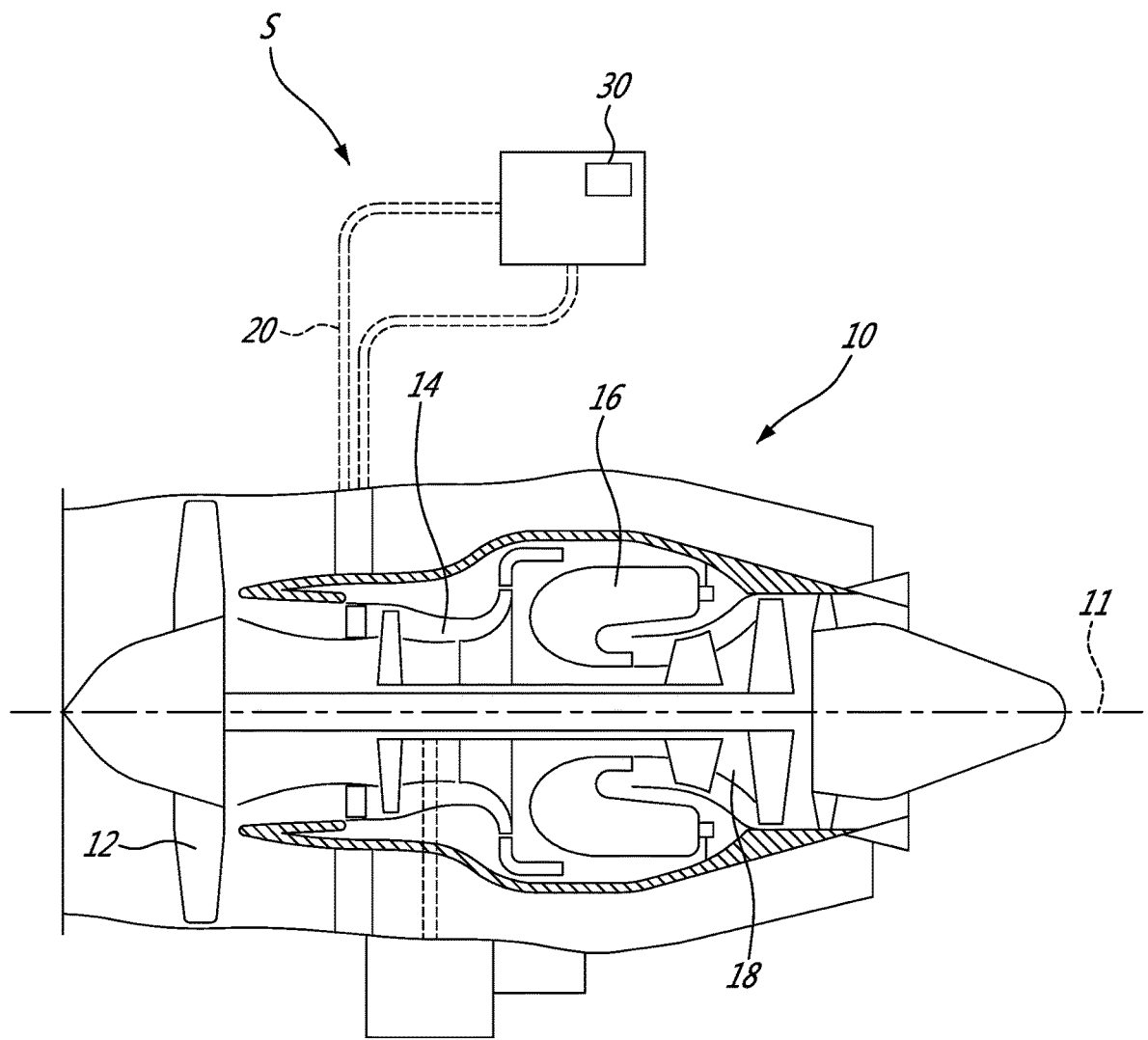

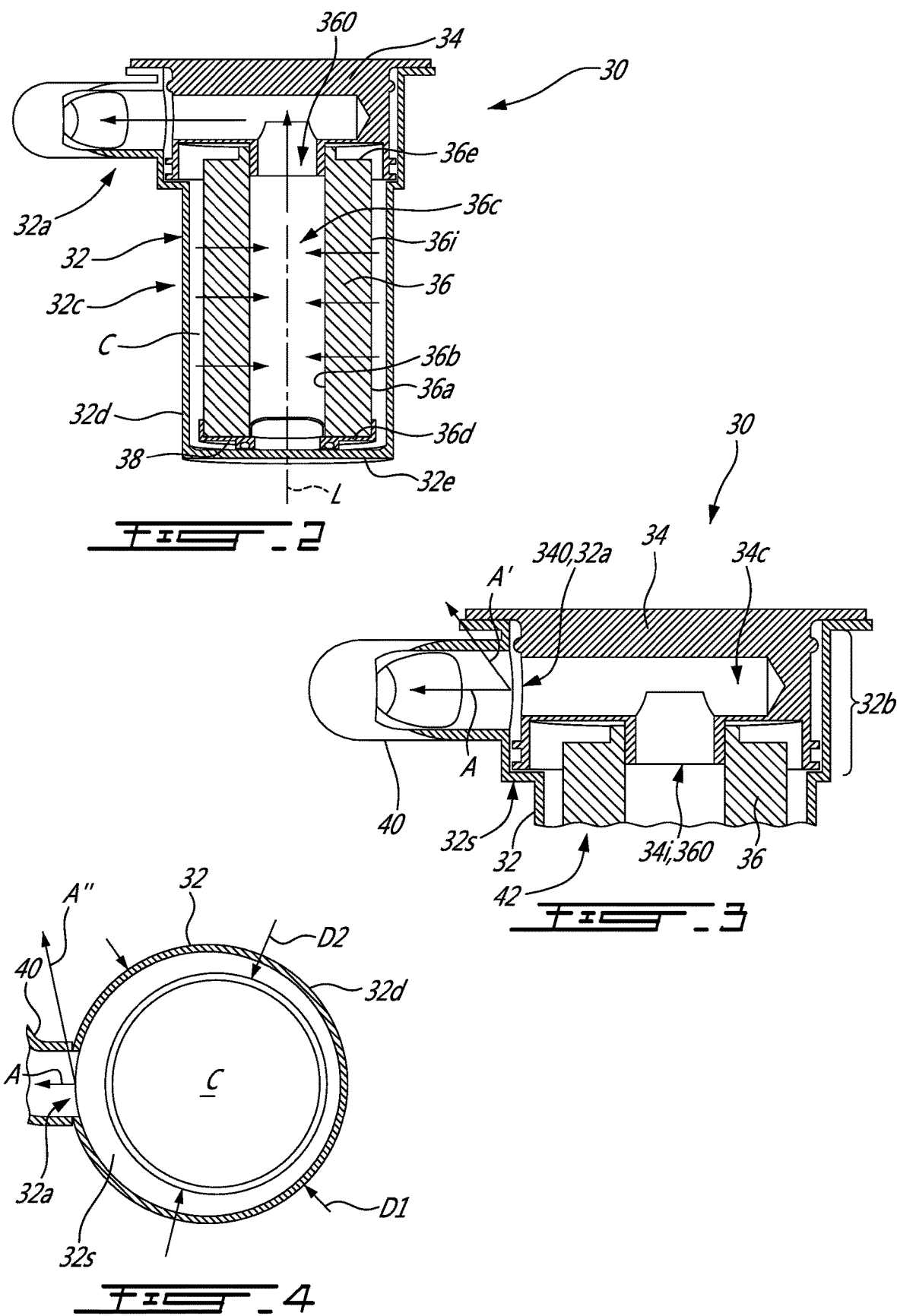

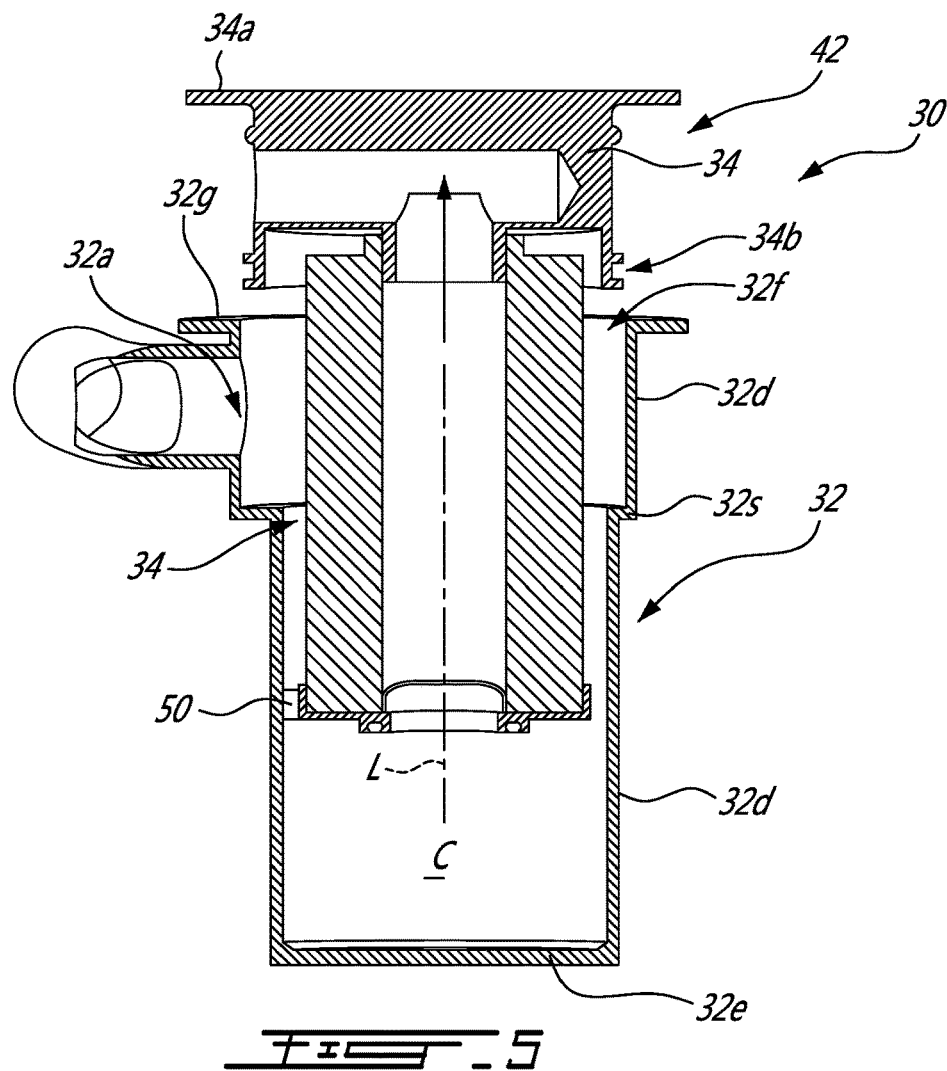
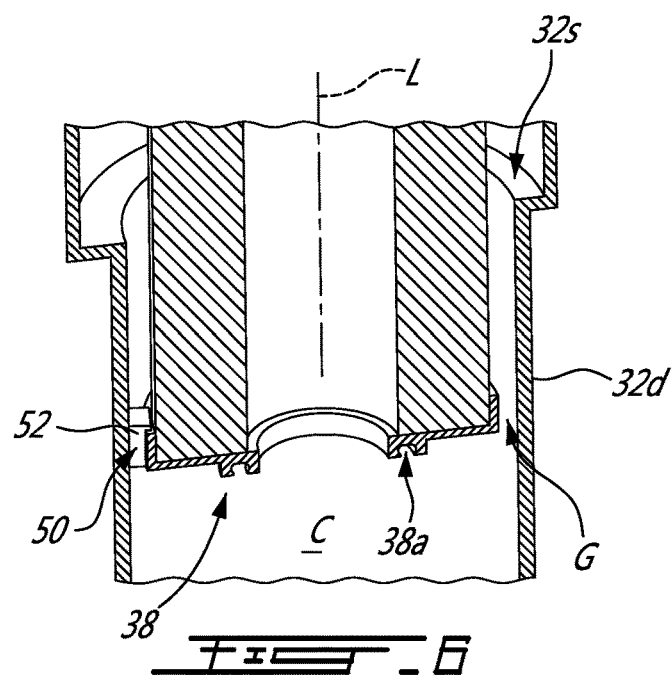

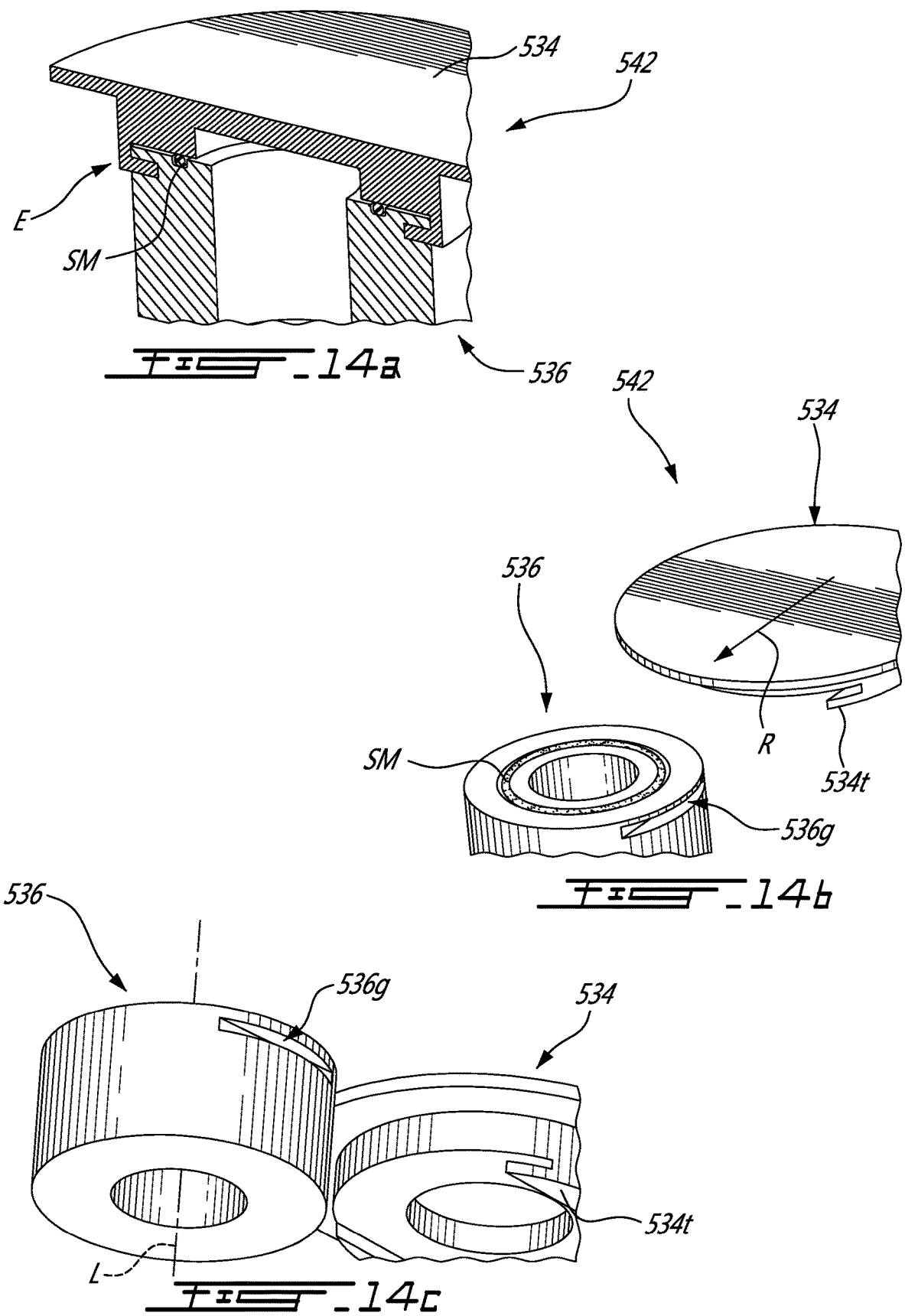

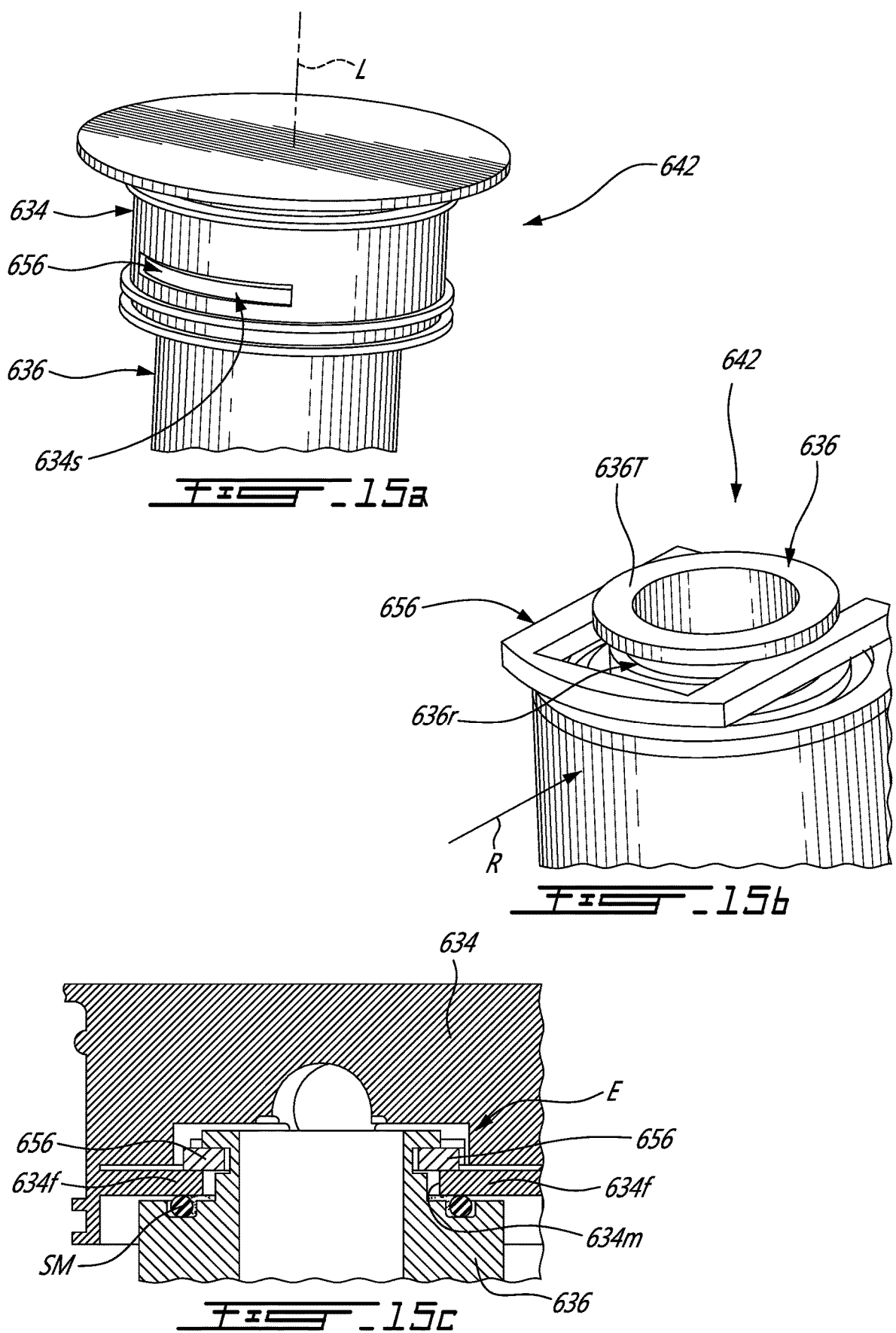

FILTER ASSEMBLY FOR GAS TURBINE ENGINE

CROSS-REFERENCE TO RELATED APPLICATION

This application is a continuation of U.S. patent application Ser. No. 16/778,443 filed on Jan. 31, 2020, the entire contents of which are incorporated by reference herein.

TECHNICAL FIELD

The application relates generally to gas turbine engines and, more particularly, to filters used in such engines.

BACKGROUND OF THE ART

Gas turbine engines use lubricant to distribute heat, lubricate bearings, reduce friction, etc. This lubricant is circulated through the engine and can carry physical contaminants, such as carbon particles, metal particles, dirt, etc. Accordingly, lubricant is periodically passed through a lubricant filtration unit comprising one or more filters in order to remove at least a portion of the contaminants from the lubricant before the lubricant is circulated back into the engine.

SUMMARY

In one aspect, there is provided a filter housing for containing a cartridge assembly having a filter cartridge secured to a filter cover, the filter housing comprising a peripheral wall extending around a longitudinal axis, and end wall secured to the peripheral wall, the filter housing defining a cavity partially enclosed by the peripheral wall and the end wall, the peripheral wall defining a cartridge-receiving section extending from the end wall along the longitudinal axis and sized for receiving the filter cartridge and a cover-receiving section extending along the longitudinal axis from the cartridge-receiving section to an open end of the filter housing opposed to the end wall and sized for receiving the filter cover, a portion of the cover-receiving section recessed radially outwardly from the cartridge-receiving section relative to the longitudinal axis, a lubricant outlet of the filter housing extending through the portion of the cover-receiving section of the peripheral wall.

The filter housing may include any of the following features, in any combinations.

In some embodiments, the cartridge-receiving section and the cover-receiving section of the peripheral wall are cylindrical, a diameter of the cover-receiving section greater than a diameter of the cartridge-receiving section.

In some embodiments, the cartridge-receiving section is connected to the cover-receiving section by a shoulder.

In some embodiments, the cartridge-receiving section is off-centered relative to the cover-receiving section such that a radial dimension of the shoulder relative of the longitudinal axis varies circumferentially around the longitudinal axis.

In some embodiments, the lubricant outlet and the portion of the cover-receiving section are circumferentially aligned with a location where the radial dimension of the shoulder is maximal.

In some embodiments, the lubricant outlet defines an exit flow axis having a radial component relative to the longitudinal axis.

In some embodiments, the exit flow axis further has a circumferential and/or an axial component relative to the longitudinal axis.

In some embodiments, a cross-sectional area of the filter housing taken along a plane normal to the longitudinal axis is greater at the cover-receiving section than at the cartridge-receiving section.

In some embodiments, a circumferential length of the portion of the cover-receiving section relative to the longitudinal axis equals to or is greater than a dimension of the lubricant outlet in a circumferential direction.

In another aspect, there is provided a filter assembly comprising: a housing having a peripheral wall extending around a longitudinal axis and end wall secured to the peripheral wall, the housing defining a cavity partially enclosed by the peripheral wall and the end wall, the peripheral wall defining a first section extending from the end wall along the longitudinal axis and a second section extending along the longitudinal axis from the first section toward an open end of the housing opposed to the end wall, a circumferential portion of the second section extending radially beyond the first section relative to the longitudinal axis, the housing defining a lubricant outlet defined through the peripheral wall at the circumferential portion of the second section; and a cover at least partially received within the housing and sealingly engaged to the housing, the cover defining an internal passage communicating with the lubricant outlet.

The filter assembly may include any of the following features, in any combinations.

In some embodiments, the peripheral wall is cylindrical, a diameter of the peripheral wall at the second section greater than a diameter of the peripheral wall at the first section.

In some embodiments, a central axis of the second section is radially offset from a central axis of the first section.

In some embodiments, the circumferential portion registers with a location where a radial distance between the first section and the second section is maximal.

In some embodiments, the lubricant outlet defines an exit flow axis having a radial component relative to the longitudinal axis.

In some embodiments, the exit flow axis further has a circumferential and/or an axial component relative to the longitudinal axis.

In some embodiments, the cover is in abutment against an abutment face defined by the peripheral wall at an intersection between the first section and the second section.

In some embodiments, a sealing engagement is created by a sealing member sandwiched between the cover and the peripheral wall.

In some embodiments, the sealing member is received within an annular groove circumferentially extending around the longitudinal axis, the annular groove facing a direction having a radial component relative to the longitudinal axis.

In some embodiments, the housing has a peripheral flange protruding at least radially outwardly from the second section of the peripheral wall proximate the open end of the housing, the peripheral flange detachably securable to the cover.

In some embodiments, a cross-sectional area of the housing taken along a plane normal to the longitudinal axis is greater at the second section than at the first section.

DESCRIPTION OF THE DRAWINGS

Reference is now made to the accompanying figures in which:

FIG. 1 is a schematic cross sectional view of a gas turbine engine;

FIG. 2 is a schematic cutaway view of a filter assembly for the gas turbine engine of FIG. 1 in accordance with one embodiment;

FIG. 3 is an enlarged view of a portion of FIG. 2;

FIG. 4 is a schematic top view of a housing of the filter assembly of FIG. 2;

FIG. 5 is a schematic cutaway partially exploded view of the filter assembly of FIG. 2;

FIG. 6 is a schematic cutaway three dimensional view of a bottom portion of the filter assembly of FIG. 2;

FIGS. 14a to 14c are respectively schematic three dimensional cutaway view; schematic top three dimensional exploded view; and schematic bottom three dimensional exploded view of a filter cartridge assembly in accordance with another embodiment illustrating steps to assemble the filter cartridge assembly;

FIGS. 15a to 15c are respectively schematic assembled top three dimensional view; schematic partially assembled top three dimensional view; and schematic assembled cutaway view a filter cartridge assembly in accordance with another embodiment illustrating steps to assemble the filter cartridge assembly.

DETAILED DESCRIPTION

Figure 7:
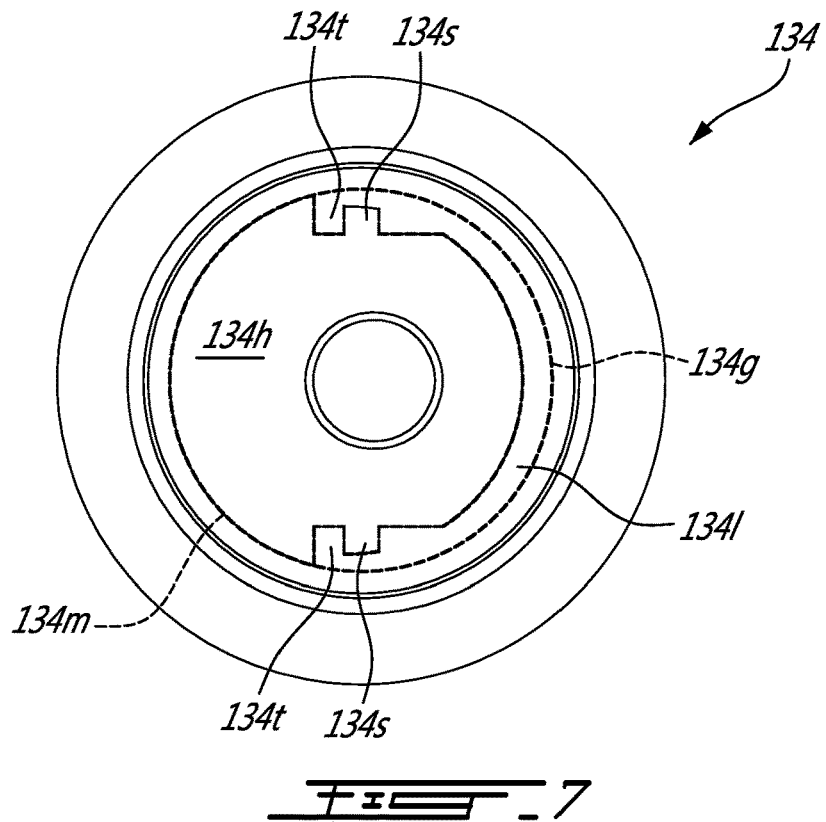
FIG. 7 is a schematic bottom view of a filter cover of a cartridge assembly in accordance with one embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

The gas turbine engine 10 may include a lubrication system S that may include a pump (not shown), lubrication conduits 20, a lubricant reservoir (not shown), and a filter assembly 30. The lubrication system S may also include additional components such as valve(s) (not shown), heat exchangers, etc. The lubricant reservoir may be in fluid flow communication with one or more components of the engine 10 in need of lubrication, such as, for instance, bearing cavity(ies), gearbox(es), and so on. The pump induces a flow of the lubricant from the lubricant reservoir, to the one or more components of the engine 10 in need of lubrication, back from the one or more components toward the reservoir and through the filter assembly 30. The filter assembly 30 is used to remove contaminants from the lubricant before flowing the lubricant towards the one or more components.

In some configurations, a lubricant filter assembly, which includes a filter cartridge and a housing containing the filter cartridge, are secured to a gas turbine engine in such a way that replacement of the filter cartridge includes pulling the whole filter assembly downward. However, in some other configurations, the location of the lubricant filter assembly is such that there is no room to allow the lubricant filter cartridge to be moved downwardly and must be changed from a top. Moreover, care should be taken to ensure that there are no debris that falls into a clean lubricant outlet of the filter assembly when changing the filter cartridge. There is disclosed herein a filter assembly that may alleviate at least some of the aforementioned problems. More specifically, the disclosed filter assembly uses a filter housing defining a lower section for receiving the filter cartridge and an upper section for receiving a filter cover that is securable to the filter housing and to the filter cartridge. The upper section has a greater diameter than that of the lower section for creating a shoulder against which the filter cover abuts. A keyway engagement may be defined between the filter cartridge and the filter cover to secure the filter cartridge to the filter cover and to create a sealing engagement therebetween.

The clean lubricant outlet of the filter housing may be defined through a peripheral wall of the filter housing. This may prevent debris from falling into said outlet since the outlet may be out of reach of the debris that would fall vertically with gravity upon removal of the filter cartridge and filter cover.

Referring now to FIGS. 2-4, the filter assembly 30 is shown in greater detail. In the embodiment shown, the filter assembly 30 includes a filter housing 32, a filter cover 34, and a filter cartridge 36. The filter cartridge 36 may be removably secured to the filter cover 34. The filter housing 32 is configured to contain the filter cartridge 36 and the filter cover 34 is configured to sealingly engage the filter housing 32 to create a filter internal volume, or cavity, C within which the lubricant circulates through the filter cartridge 36; the filter cartridge 36 being contain within the filter internal volume C of the filter housing 32. In the depicted embodiment, the filter assembly 30 has a generally cylindrical shape and extends about a longitudinal axis L. It is understood that other shapes are contemplated without departing from the scope of the present disclosure.

The filter housing 32, referred simply as housing 32 herein below, is configured to receive the filter cartridge 36 therein. The filter housing 32 has an inlet (not shown) configured for receiving lubricant to be filtered and has an outlet 32a for outputting a flow of filtered lubricant. The housing 32 has an upper section 32b (FIG. 3) and a lower section 32c (FIG. 2). The lower section 32c is configured to receive a major portion, that is more than half herein, of the filter cartridge 36. The outlet 32a of the housing 32 is defined at the upper section 23b of the housing 32.

In the embodiment shown, the housing 32 has a circumferential wall 32d and an end wall 32e secured to an end of the circumferential wall 32d. The circumferential wall 32d extends circumferentially around the longitudinal axis L of the filter assembly 30 and is cylindrical in the depicted embodiment. It will be appreciated that other shapes are contemplated, such as, for instance, oval, square, and so on. The outlet 32a of the housing 32 is defined through the circumferential wall 32d at the upper section 32b of the housing 32. Having the outlet 32a of the housing 32 locating as such may avoid contaminant to fall into the outlet 32a upon removal of the filter cover 34 and filter cartridge 36 during maintenance and replacement of the filter cartridge 36.

As shown more clearly in FIGS. 3-4, the outlet 32a of the housing 32 is hydraulically connected with a line 40, which may be part of the housing 32. The line 40 may extend substantially perpendicularly to the circumferential wall 32d of the housing 32 such that the lubricant exits the filter assembly 30 in a radial direction, depicted by arrow A on FIGS. 3-4, relative to the longitudinal axis L. Alternatively, the line 40 may define an angle different than 90 degrees relative to the circumferential wall 32d of the housing 32. Arrows A' and A" in FIGS. 3-4 show that the line 40, and the flow of lubricant exiting the filter housing 32, may circulate in a radial direction combined with an axial and/or a circumferential direction relative to the longitudinal axis L. The angle the line 40 defines with respect to the housing 32 may depend upon a location where the filter assembly 30 is installed in the engine 10.

Still referring to FIGS. 3-4, the housing 32 defines a shoulder 32s at an intersection between the upper and lower sections 32b, 32c of the housing 32. In the embodiment shown, a diameter D1 of the upper section 32b is greater than a diameter D2 of the lower section 32c thereby creating the shoulder 32s. As shown in FIG. 4, the upper and lower sections 32b, 32c of the housing 32 are cylindrical and are radially offset from one another. In other words, the upper and lower sections 32b, 32c are not concentric. Alternatively, the upper and lower sections 32b, 32c may be concentric. In a particular embodiment, this offset between the upper and lower sections 32b, 32c of the housing 32 may create additional space to slide the cartridge 36, when said cartridge 36 is secured to the cover 34, within the housing 32. This space may be obtained by having the upper and lower sections 32b, 32c of the housing 32 being concentric and by increasing a diameter of the upper section 32b relative to that of the lower section 32c. In a particular embodiment, this offset between the upper and lower sections 32b, 32c of the housing 32 creates the shoulder near the outlet of the housing and may help in protecting the outlet from contaminants that may be released during removal of the filter assembly.

Referring more particularly to FIG. 2, the filter cartridge 36 may include any suitable filtering medium known in the art. In the embodiment shown, the filter cartridge 36 has an annular shape and has an outer wall 36a, an inner wall 36b located radially inwardly of the outer wall 36a relative to the longitudinal axis L of the filter assembly 30. Herein, both the outer and inner walls 36a, 36b extends circumferentially about the longitudinal axis L. Herein, the outer and inner walls 36a, 36b are cylindrical, but other shapes are contemplated. The filter cartridge 36 may define a central passage 36c that may extend from a lower end 36d to an upper end 36e of the filter cartridge 36. The filter cartridge 36 has an inlet 36i and an outlet 36o. In the embodiment shown, the inlet 36i of the filter cartridge 36 corresponds to the outer wall 36a, such that the lubricant enters in the filter cartridge 36 in a substantially radial direction relative to the longitudinal axis L of the filter assembly 30, and the outlet 36o of the filter cartridge 36 corresponds to the central passage 36c at the upper end 36e of the filter cartridge 36, such that the lubricant exits the filter cartridge 36 in a substantially axial direction relative to the longitudinal axis of the filter assembly 30. It is understood that the expressions "upper" and "lower" may be interchanged and that the disclosed filter 30 may be used upside down, or at any other angle.

A plug 38 is secured to the filter cartridge 36 at the lower end 36d thereof. The plug 38 may be used to prevent lubricant to enter the filter cartridge 36 via an annular end face located at the lower end 36d of the filter cartridge 36. In other words, the plug 38 may be used to prevent the lubricant from entering the filter cartridge 36 in a substantially axial direction. The plug 38 may ensure that the oil passes through the filter cartridge 36. Stated differently, the plug 38 may prevent lubricant from penetrating the seal from an axial end face of the cartridge 36. The filter cartridge 36 may be free of the plug 38 by having the filter cartridge 36 in abutment against a bottom of the housing 32 to avoid oil from bypassing the cartridge 36. As shown more clearly on FIG. 6, a annular groove 38a is defined by the plug 38 and may be configured for receiving a seal, such as an O-ring or any other suitable sealing member, therein.

Referring to FIGS. 3 and 5, for installing a cartridge assembly 42 of the filter cover 34 and the filter cartridge 36 inside the filter housing 32, the cartridge assembly 42 is inserted into the housing 32 substantially along an axial direction relative to the longitudinal axis L via an open end 32f (FIG. 5) of the filter housing 32. The cartridge assembly 42 is moved relative to the filter housing 32 along the axial direction toward the end wall 32e (FIG. 5) of the filter housing 32 until the cover 34 is in abutment against the shoulder 32s (FIG. 5) defined by the housing 32.

As shown in FIG. 5, the filter cover 34 has an annular flange 34a at a top end thereof and the filter housing 32 has an annular flange 32g at the open end 32f thereof. Once the cartridge assembly 42 is received within the filter housing 32, the annular flanges 32g, 34a of the housing 32 and cover 34 may be secured to one another to hold the cartridge assembly 42 in place relative to the filter housing 32. Any suitable means to secure the annular flanges 32g, 34a to one another may be used. In a particular embodiment, a sealing engagement is created between the annular flanges 32g, 34a. Herein, the annular flanges 32g, 34a have substantially circular shapes, but other shapes are contemplated. Captive fasteners may be used to assemble the cover 34 to the housing 32 in order to reduce the chances of FOD. A quick release latch for a tool may be used to secure the cover 34 to the housing 32.

Alternatively, or in combination, a sealing engagement may be created between the cover 34 and the housing 32 at a location proximate the shoulder 32s of the housing 32. As shown in FIG. 5, an annular groove 34b is defined by the cover 34 at a lower end thereof and extends substantially all around the longitudinal axis L. The annular groove 34b is configured to receive a sealing member, such as an O-ring (not shown), therein. In the embodiment shown, the annular groove 34b faces the radial direction such that the sealing member received therein may be compressed radially between the cover 34 and the peripheral wall 32d of the housing 32. Alternatively, the annular groove 34b may be defined at an axial end face of the cover 34 such that the annular groove 34b faces the axial direction and faces the shoulder 32s of the housing 32 such that the sealing member received within the annular groove 34b is compressed axially between the housing at the shoulder 32s and the cover 34. The cover 34 may define two annular grooves each receiving a respective one of two sealing members; the two annular grooves facing respectively in the radial and axial directions relative to the longitudinal axis L.

Referring more particularly to FIG. 3, the cover 34 may be used to change a direction of the lubricant from being substantially axial relative to the longitudinal axis L to being substantial radial. As aforementioned, the lubricant exits the filter cartridge 36 via its outlet 36o along a direction that is substantially axial and the outlet 32a of the filter housing 32 is defined through the peripheral wall 32d and may have at least a radial component relative to the longitudinal axis L. In the embodiment shown, the cover 34 is used to redirect the flow of lubricant from being substantially axial to being substantially radial. The filter cover 34 may be used to impart at least a radial and/or at least a circumferential component to the flow of lubricant.

In the depicted embodiment, the cover 34 has an internal passage 34c that fluidly connects an inlet 34i of the cover 34 to an outlet 34o thereof. The inlet 34i of the cover 34 is in fluid communication with the outlet 36o of the filter cartridge 36 and the outlet 34o of the cover 34 is in fluid communication with the outlet 32a of the housing 32 and with the line 40 that extends therefrom. The internal passage 34c may be defined by two bores extending partially through a body of the cover 34. Herein, the internal passage 34c includes: a first bore extending substantially axially relative to the longitudinal axis L from the outlet 36o of the filter cartridge 36 toward a top end of the cover 34 without extending fully through the cover 34; and a second bore extending from the outlet 34o of the cover 34 in a substantially radial direction to a distal end of the first bore such that the first and second bore are in fluid communication with one another. Other configurations are contemplated. The shape of the internal passage 34c and its orientation inside the cover may vary, including straight holes, smooth cores.

The circulation of the lubricant through the filter assembly 30 is depicted with arrows in FIG. 2. The lubricant enters the internal volume C defined by the filter housing 32 and passes through the filter cartridge 36 in a substantially radial direction relative to the longitudinal axis L and toward the longitudinal axis L to reach the central passage 36c of the filter cartridge. The lubricant flows axially along the central passage 36 toward the cover 34, enters the internal passage 34c of the cover 34 in a substantially axial direction and is re-oriented, within the internal passage 34c of the cover 34, in a direction having at least a radial component relative to the longitudinal axis L. The lubricant exits the filter assembly 30 via the outlet 32a of the housing 32 and is directed toward other components indeed of lubrication via the line 40 that is hydraulically connected to the housing 32.

With time, the filter cartridge 36 may decrease in efficiency and may become partially clog by the contaminants it has removed from the lubricant circulating therethrough. Consequently, it may be required to periodically disassemble the filter assembly 30 to replace the filter cartridge 36. It may be beneficial to remove the cartridge assembly 42 as a single unit.

Referring to FIG. 6, while removing the filter cartridge 36 from the housing 32, care should be taken to avoid contact between the cartridge 36 and the housing to avoid rubbing or scrapping the cartridge 36 against the peripheral wall 32d of the housing 32 which may cause contaminants picked up by the cartridge 36 to detach therefrom an to fall into the housing 32. In the embodiment shown, a guiding feature 50 is secured to an end of the cartridge 36 that is located at the bottom of the housing 32 upon the cartridge assembly 42 received therein. More specifically, and in the embodiment shown, the guiding feature 50 is secured to the plug 38 at an external periphery thereof. The guiding feature 50 may be provided in the form of one or more tab(s) 52 circumferentially distributed about the longitudinal axis L and that bridge a gap G located radially between the filter cartridge 36 and the housing 32 relative to the longitudinal axis L. The guiding feature 50 may therefore limit contacts between the cartridge 36 and the housing 32. The guiding feature may have various alternative shapes and length. It may be displayed in a circular pattern, or it can be a plate on the whole circumference with slots to allow fluid to pass.

Figure 8:
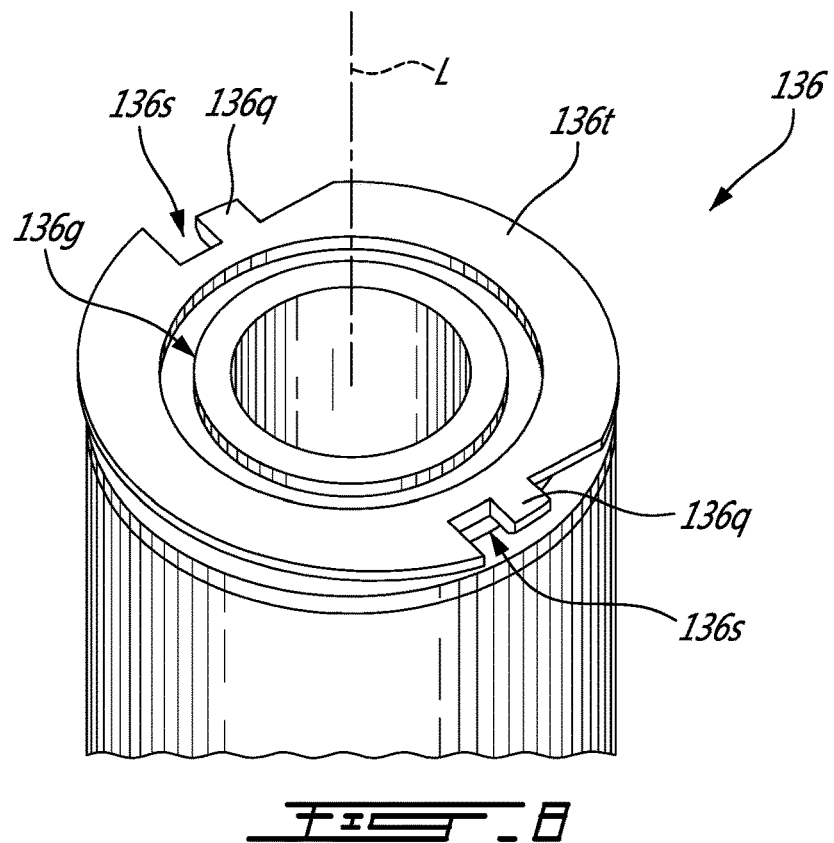
FIG. 8 is a schematic top three dimensional view of a filter cartridge that may be used with the filter cover of FIG. 7.

Referring now to FIGS. 7-8, a cover and a filter cartridge in accordance with another embodiment are shown generally at 134 and 136, respectively. And, referring concurrently to FIGS. 9a to 9c that illustrate steps of assembly the cover 134 to the filter cartridge 136. To create a locking engagement E (FIG. 9c) between the cover 134 and the filter cartridge 136, the filter cartridge 136 defines a tab or a flange 136t that may extend circumferentially around the longitudinal axis L. In the embodiment shown, the flange 136t is located at a distal end of the filter cartridge relative to a distance from the end wall 32e (FIG. 5) of the housing 32 (FIG. 5) in which the cartridge 136 may be received. The flange 136t has a thickness t1 (FIG. 9a) taken along the longitudinal axis L. The flange 136t is configured to be received within a groove 134g defined by the cover 134. The groove 134g is shown in dashed line in FIG. 7. The groove 134g may have a depth d1 (FIG. 9a) taken along the longitudinal axis L and that may corresponds substantially to the thickness t1. As shown more particularly on FIG. 7, the groove 134g is located axially between an axial end face 134h of the cover 134 and a lip 134l, which extends partially around the longitudinal axis L. The groove 134g extends radially outwardly relative to the longitudinal axis from an edge of the lip 136l. The cover 134 thereby defines an opening 134m, a periphery of which is depicted in FIG. 7 with a dashed line. The periphery of the opening 134m is defined partially by the lip 134l. As shown in FIGS. 7-8, the periphery of the opening 134m has a shape that corresponds substantially to a shape of the periphery of the flange 136t of the filter cartridge 136. It is understood that the groove and the flange may be defined by the filter cartridge and by the cover in an alternate embodiment without departing from the scope of the present disclosure. In a particular embodiment, the flange 136t may define a chamfer to ease its insertion in the groove.

Figure 9A:
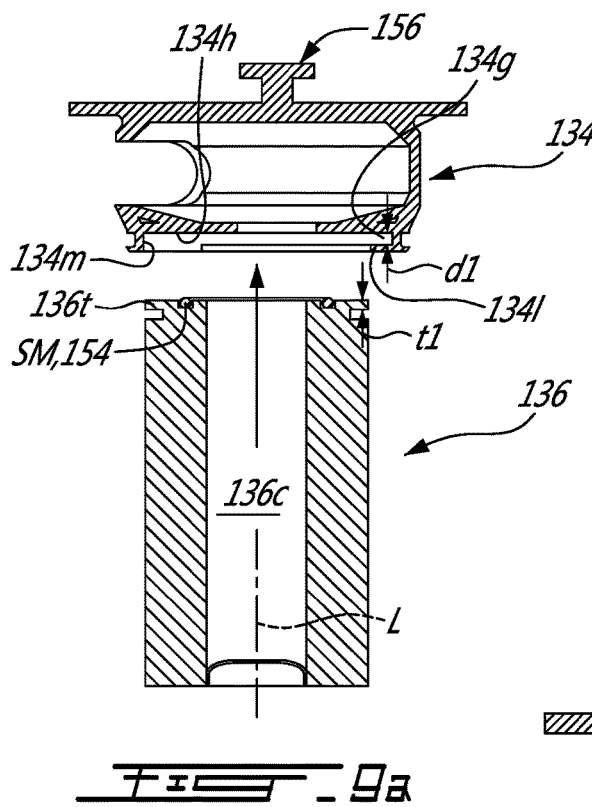
FIGS. 9a to 9c are schematic cutaway views of the cartridge assembly of FIGS. 7-8 illustrating steps to assemble the cartridge assembly.
Figure 9C:
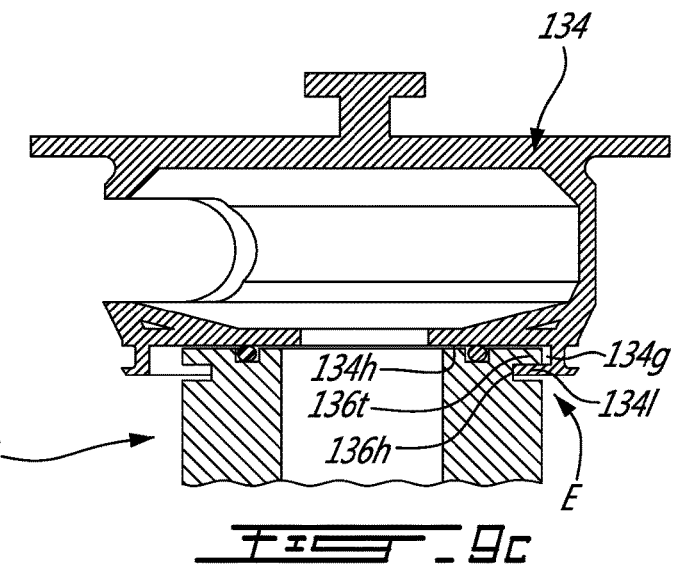
Figure 9B:
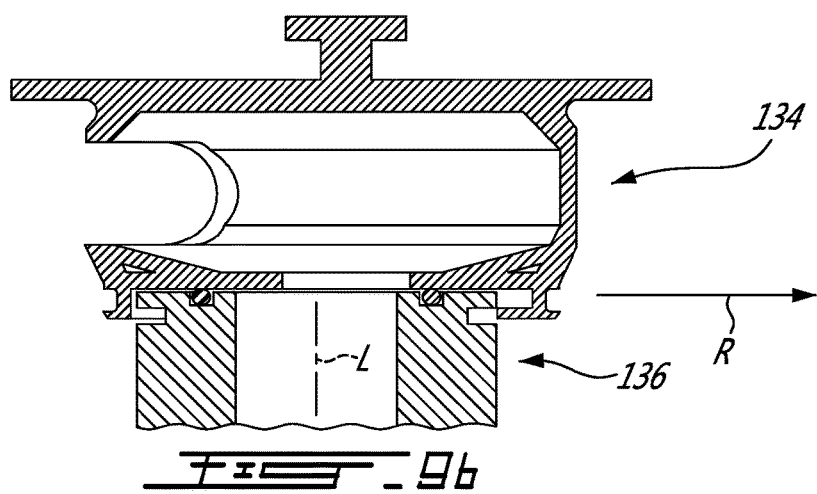

As shown more specifically in FIGS. 9a and 9b, with continued reference to FIGS. 7-8, to assemble the filter cartridge 136 to the cover 134, the cartridge 136 and the cover 134 are moved one relative to the other along the longitudinal axis L from a disengaged position shown in FIG. 9a until the flange 136t is received through the opening 134m defined by the cover 134, which corresponds to an intermediate position shown in FIG. 9b. At which point, a sealing member SM, in this case an o-ring 154, which is received within a groove 136g (FIG. 8) of the filter cartridge 136, becomes biased between the filter cartridge 136 and the axial end face 134h of the cover. The cartridge 136 may be in abutment against the axial end face 134h of the cover 134 upon the o-ring 154 biased therebetween. The sealing member SM may create a sealing engagement between the cover 134 and the cartridge 136 to limit fluid that circulates through the central passage 136c (FIG. 9a) of the filter 136 and toward the cover 134 from leaking at an interface between the cover and cartridge 134, 136. The sealing member SM may alternatively be a packing, a c-seal, a piston ring with or without a spring, a spring washer, a magnetic seal, or any other type of axial seal.

Referring more particularly to FIGS. 9b and 9c, the cover 134 may be moved relative to the cartridge 136 from the intermediary position shown in FIG. 9b to a locked position shown in FIG. 9c. In the embodiment shown, the cover 134 and cartridge 136 are moved one relative to the other along a radial direction R (FIG. 9b) relative to the longitudinal axis L. In other words, the cover 134 and the cartridge 136 are translated one relative to the other to move them from the intermediary position to the locked position of FIG. 9c. In the locked position, at least a portion of the flange 136t is received within the groove 134g of the cover 134. This creates the locking engagement E that may limit axial movement of the cover 134 relative to the cartridge 136 along the longitudinal axis L. The cooperation of the flange 136t and the groove 134g may block axial movements of the cover and cartridge 134, 136 one relative to the other. In the embodiment shown, the flange 136t becomes sandwiched between the lip 134l of the cover 134 and the axial end face 134h of the cover 134. In the embodiment shown, in the locked position depicted in FIG. 9c, the lip 134l of the cover is slidingly received within a groove 136h defined by the cartridge proximate the flange 136t upon the flange 136t received within the groove 134g of the cover 134.

In an alternate embodiment, the cover and cartridge 134, 136 may be rotated one relative to the other about the longitudinal axis L to move the cover and cartridge from the intermediate position to the locked position. Other configurations are contemplated without departing from the scope of the present disclosure. Once the cover 134 and the cartridge 136 are in the locked position, the filter cartridge assembly may be moved within the housing 32 (FIG. 2) using a handle 156 (FIG. 9a) located on top of the cover 134. Other means of manipulating the cartridge assembly are contemplated.

Referring back to FIGS. 7-8, the shape of the opening 134m is configured to maximize a surface contact, or retention surface, area between the lip 134l and the flange 136t of the cover and cartridge 134, 136 respectively. In the embodiment shown, the opening 134m defines at least one tooth 134t, two teeth 134t in the embodiment shown, and at least one slot 134s, two slots 134s in the embodiment shown. Correspondingly, the flange 136 may define at least one slot 136s, two in the embodiment shown, and at least one tooth 136q, two teeth 136q in the embodiment shown. The teeth 136q of the flange 136t are slidably received within the slots 134s of the opening 134m and the teeth 134t of the opening 134m are slidingly receive within the slots 136s of the flange 136t. In other words, the opening 134m may have a keyway shape corresponding to a shape of the flange 136t to allow one to be received within the other. In the embodiment shown, the opening 134m and the flange 136t are non-axisymmetric and may define a symmetry plane containing the longitudinal axis L.

Figure 10:
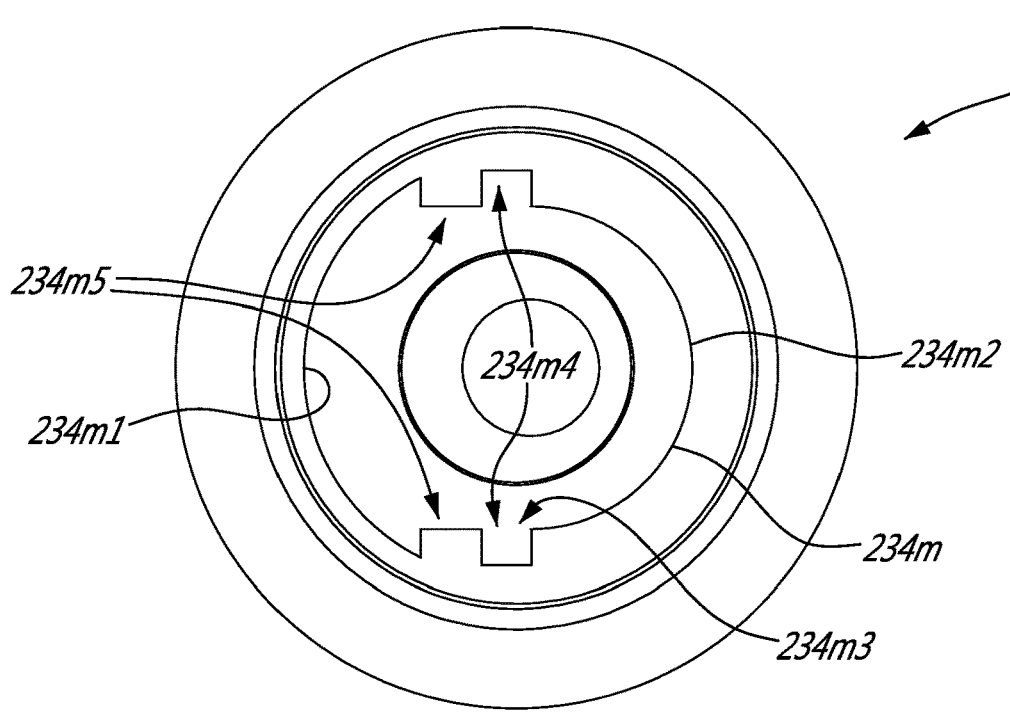
FIG. 10 is a schematic bottom view of a filter cover in accordance with another embodiment.
Figure 11:
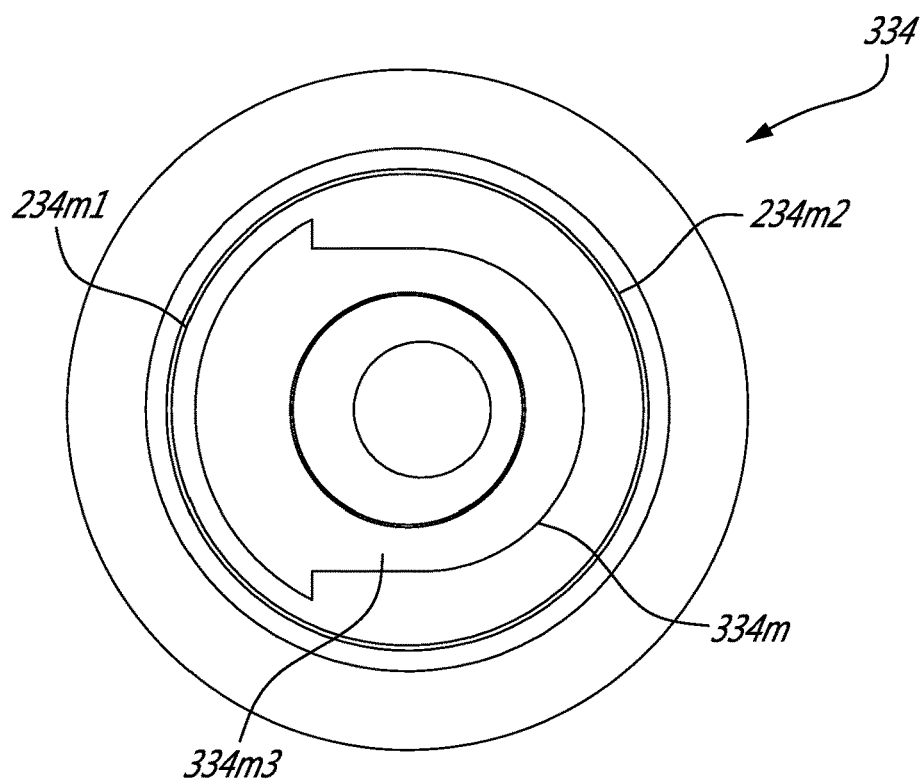
FIG. 11 is a schematic bottom view of a filter cover in accordance with another embodiment.

Referring now to FIGS. 10-11, alternative embodiments of the cover are shown generally at 234 and 334, respectively. The cover 234, 334 may different from the cover 134 of FIG. 7 by the shape of their opening 234m, 334m. As shown, a number of teeth/slot may be varied. Any other suitable shape may be used. The shape of the opening of the cover and that of the flange may be used to ensure that the filter cartridge and cover are matingly engageable to one another solely in one orientation of the cover relative to the filter cartridge.

Referring more particularly to FIG. 10, the opening 234m includes first and second curved sections 234m1, 234m2 diametrically opposed to one another; a diameter the first curved section 234m1 being greater than that of the second section 234m2. The first and second sections 234m1, 234m2 are connected via a middle section 234m3. The middle section 234m3 defines two slots 234m4 and two teeth 234m5; the two slots facing one another and the two teeth facing one another. In the embodiment shown, the middle section is tangent to the second section. Other configurations are contemplated. For instance, in FIG. 7, the middle section is straight and a junction between the middle and second sections defines a kink. Referring more particularly to FIG. 11, the opening 334m is similar to the opening 234m described above with reference to FIG. 10, but the middle section 334m3 is free of the teeth and slot.

The different shapes of the opening and corresponding flange may be selected to provide a uniformity of a biasing force exerted by the interaction of the cover and filter cartridge on the sealing member when in the locked position shown in FIG. 9c. The shape of the opening may dictate a surface area used to retain the filter as well as its disposition near the seal. The shape shown in FIG. 10 may offer a larger retaining surface. The teeth may be used as a mean to prevent or limit the rotation of the filter cartridge 36 relative to the cover 34 should a sliding motion is used to disassemble the cartridge 36 from the cover 34.

Figure 12:
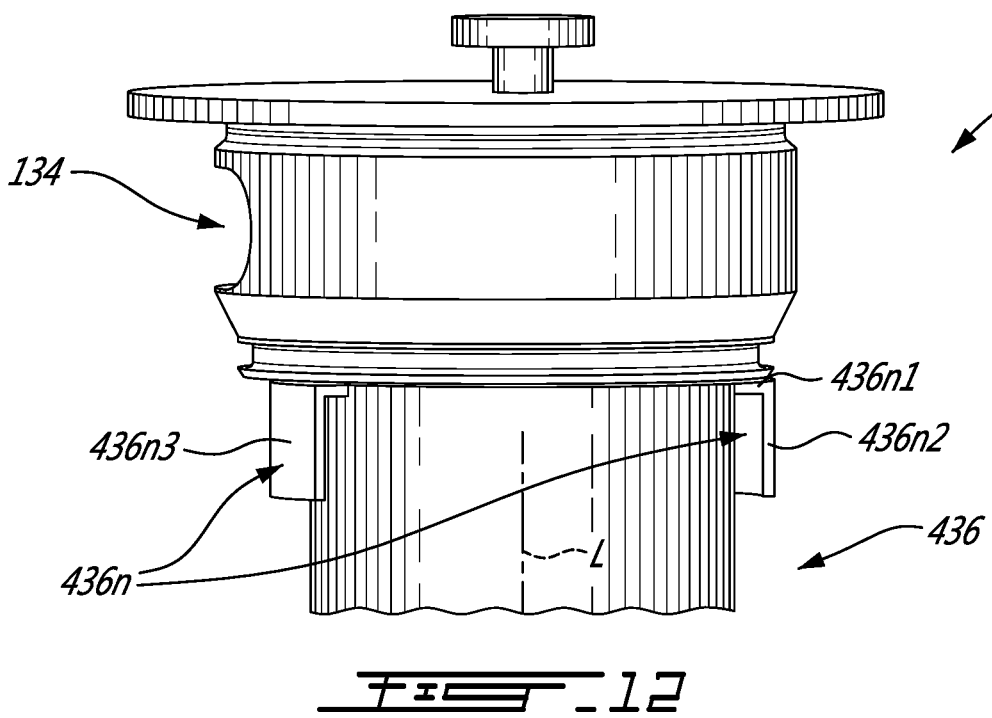
FIG. 12 is a schematic three dimensional view of a cartridge assembly in accordance with another embodiment.
Figure 13:
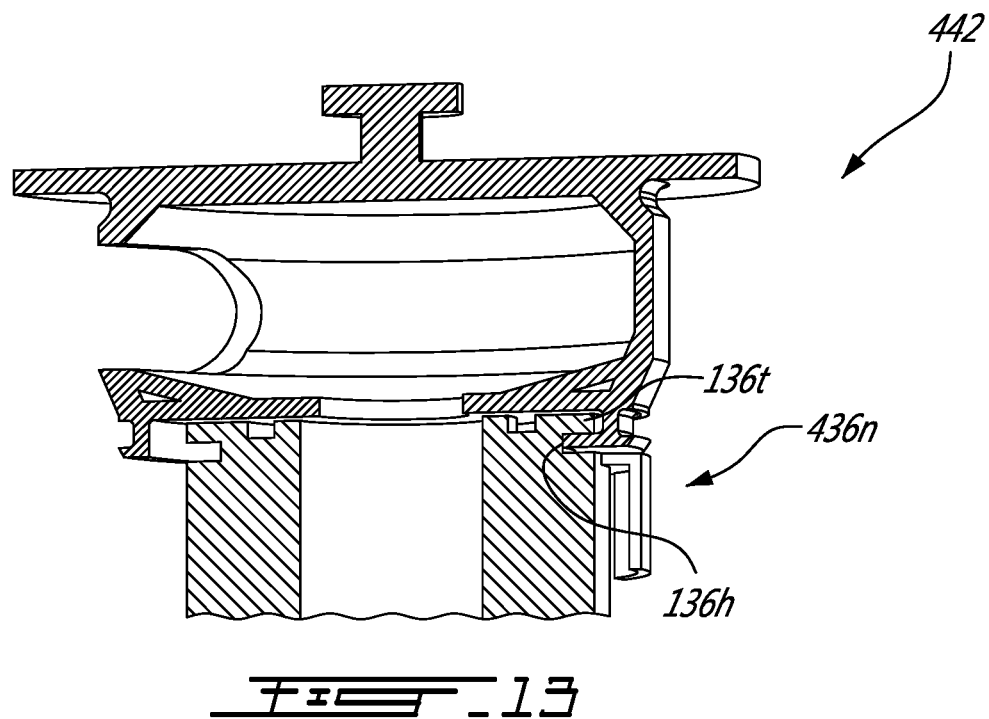
FIG. 13 is a schematic cutaway three dimensional view of the cartridge assembly of FIG. 12.

Referring to FIGS. 12-13, a cartridge assembly in accordance with another embodiment is shown generally at 442. The cartridge assembly 442 includes a cover which may correspond to the cover 134 described above with reference to FIG. 7 and a filter cartridge 436 in accordance with another embodiment. In some cases, it may be required to grab the cartridge 436 for either assisting its removal from the housing 32 (FIG. 2) and/or to orient it with respect to the cover 134. However, the filtering medium of the cartridge may be soft and grabbing it directly may deform it, which may impair its filtering efficiency.

In the embodiment shown, the filter cartridge 436 includes at least one, two in the embodiment shown, holding tabs 436n, each of which may be L-shaped including a radial protrusion 436n1 extending radially away from a proximal end of the cartridge 436 and an axial protrusion 436n2 protruding axially from a distal free end of the radial protrusion 436n1. The axial protrusions 436n2 defines a surface 436n3 against which a user may lay his/her finger to manipulate the filter cartridge 436. In the embodiment shown, the axial protrusions 436n2 extends axially relative to the longitudinal axis L toward the end wall of the housing 32 (FIG. 2) when received therein. As shown in FIG. 13, the holding tabs 436n are axially offset from the flange 136t and groove 136h defined by the cartridge 436.

The support or holding tabs 436n may be used if the pinch (e.g. biasing force) between the filter cover 134 and the sealing member SM (FIG. 9a) is high enough to expect a deformation of the filter cartridge 436 during assembly. The tabs 436n may ease the grip by hand or tool and may be configured to re-direct the load path outside the filter element (e.g. filtering medium). The support may or may not serve as a filter guiding feature once in the locked position. In other words, the tabs may be in abutment against the wall of the housing to maintain the cartridge concentric with the housing.

Referring to FIGS. 14a to 14c, another embodiment of a cartridge assembly is shown generally at 542. The assembly 542 includes a cover 534 and a filter cartridge 536. In the embodiment shown, the cover 534 defines two tabs 534t that are diametrically opposed to one another and the filter cartridge 536 defines two grooves 536g that are diametrically opposed to one another. Each of the tabs 534 of the cover 534 may be slidingly received within a respective one of the grooves 536g of the cartridge 536. It is understood that the cover may define the grooves and the cartridge may define the tab in an alternate embodiment.

FIGS. 14b and 14c illustrate the assembly 542 in the disengaged position and FIG. 14c illustrates the assembly in the locked position in which the sealing member SM is compressed between the cover and cartridge 534, 536. To create the locking engagement E between the cover 534 and the cartridge 536, the cover and cartridge are moved one relative to the other until the grooves 536g are in register with the tabs 534t. At which point, the cover and the cartridge 534, 536 are moved one relative to the other in a radial direction R relative to the longitudinal axis L to slide the tabs 534t within the grooves 536g.

Referring to FIGS. 15a to 15c, another embodiment of a cartridge assembly is shown generally at 642. The assembly 642 includes a cover 634, a cartridge 636, and a locking member also referred to as a fork 656. In the embodiment shown, the cover 634 defines an elongated slot 634s dimensioned for receiving the fork 656. The cartridge 636 defines a tab 636t at an extremity of the cartridge 636. A recess 636r is defined by the cartridge 636 proximate the tab 636t. The cover 634 has an opening 634m suitably dimensioned for receiving the tab 636t of the cartridge 636.

To create the locking engagement E between the cover and cartridge 634, 636, the cover and cartridge 634, 636 are moved one relative to the other along the longitudinal axis L until the tab 636t of the cartridge 636 is received within the opening 634m of the cover 634. At which point, the fork 656 may be inserted in the elongated slot 634s of the cover 634 in a radial direction R relative to the longitudinal axis L. The fork 656 thereby locks the tab 636t of the cartridge 636 within the cover 634. More specifically, the fork 656 has an inner dimension suitably dimensioned to be able to be received within the recess 636r of the cartridge 636 and that is less than a diameter of the tab 636t, and has an outer dimension that is greater than a dimension of the opening 634m of the cover 634 such that, upon the fork 656 received within the elongated slot 634s of the cover 634, movement of the cover 634 relative to the filter cartridge 636 along the longitudinal axis L is limited by the fork 656 and, more specifically, limited by the interaction of the fork 656 with the tab 636t of the cartridge 636 and with an annular flange 634f of the cover 634, which defines the opening 634m of the cover 634. In other words, the fork 656 is configured to be in abutment with both of the tab 636t of the cartridge 636 and with the annular flange 634f of the cover 634 to limit movements of the cover 634 relative to the cartridge 636.

As part of the regular scheduled maintenance of an aircraft turbine engine, the lubricant/fuel filters may have to be replaced. It may be important that the filters are easily accessible as this may minimize the risk of introducing debris into the engine. On a twin engine application, the filter may have to be accessible from both sides of the engine. The disclosed filter assembly may minimize the risk of disassembly or mis-assembly that may lead to improper sealing between the inlet and outlet.

In some cases, filter upright position may be the most desirable one. The outlet may need to be protected against falling debris and filter contaminants. There may be an interest to ease the maintenance by removing the filter with the filter cover. The disclosed filter assemblies may be able to hide the outlet of the filter into the filter cover; ensure a connection to the engine that may not expose the outlet; and ensure a sub-assembly (e.g., filter cartridge assembly 42) between the filter cartridge and the filter cover that may be required by design to assemble the sub-assembly in the filter housing. These may be achieved by a stepped filter housing 32; a filter assembly sequence that may include an axial seal and a keyway shape interface; and/or filter guiding features.

A stepped filter housing may allow a filter to be mounted vertically upwards. The cover may transfer the fluid to a horizontal connection located on the outlet bore further from the filter bore. This recess may allow the connection to be protected against the filter contaminants in case contaminants are scraped on the filter housing bore during maintenance. The horizontal orientation may minimize the possibility of introducing dirt back into the engine. This step may be achieved by two concentric or non-concentric bores, or by a stepped bore of different shape. If the filter is mounted near the top of the engine it may be equally accessible from both sides of the engine.

The filter assembly sequence may ensure a minimized disassembly or mis-assembly risk when installed in the housing while allowing to remove the filter with the filter cover. The filter may feature a keyway-shaped flange and an axial seal. The filter cover may feature a keyway-shape slot and a groove. To assemble, the keyway-shaped flange and groove may be aligned and engaged. The filter may slide transversely to apply an axial load on the seal and to fix the filter on the filter cover. The assembly sequence may ensure the axial seal is loaded and the sub-assembly can only be assembled in the housing if the second step is completed.

The filter guiding features may ensure the filter is properly assembled and sealed on the filter cover when finally assembled in the housing. If the guiding features are located at the bottom of the filter, they may ensure the filter remains concentric to the filter bore in order to reduce the risk of scraping the contaminant from the filter to the housing outlet when the filter is being removed.

The stepped housing bore may allow for additional radial space to slide the filter on the cover. The filter guiding feature may ensure the filter remains assembled after final assembly when used with a face seal.

The disclosed filter assemblies and cartridge assemblies may ease maintainability since securing the outlet from debris may allow to use an upright positioned filter. This may be preferable from a maintenance perspective since the bolts and filter may be directly visible/accessible from the top facilitating their access from both sides of the engine. The disclosed filter assemblies and cartridge assemblies may ease packaging since they may minimize the overall envelope required in the nacelle when mounted near the top and when the nacelle door is located at the top. The disclosed filter assemblies and cartridge assemblies may ease maintenance since they allow to remove the filter with the filter cover which may avoid the use of standard or special tooling to remove the filter.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, it is understood that the disclosed filter assemblies and cartridge assemblies may be oriented in different orientations such as horizontally, vertically, or at any intermediate angle. Yet further modifications could be implemented by a person of ordinary skill in the art in view of the present disclosure, which modifications would be within the scope of the present technology.

The invention claimed is:

1. A filter housing for containing a cartridge assembly having a filter cartridge secured to a filter cover, the filter housing comprising a peripheral wall extending around a longitudinal axis, and end wall secured to the peripheral wall, the filter housing defining a cavity partially enclosed by the peripheral wall and the end wall, the peripheral wall defining a cartridge-receiving section extending from the end wall along the longitudinal axis and sized for receiving the filter cartridge and a cover-receiving section extending along the longitudinal axis from the cartridge-receiving section to an open end of the filter housing opposed to the end wall and sized for receiving the filter cover, a portion of the cover-receiving section recessed radially outwardly from the cartridge-receiving section relative to the longitudinal axis, a lubricant outlet of the filter housing extending through the portion of the cover-receiving section of the peripheral wall, the cartridge-receiving section is connected to the cover-receiving section by a shoulder, the cartridge-receiving section is off-centered relative to the cover-receiving section such that a radial dimension of the shoulder relative of the longitudinal axis varies circumferentially around the longitudinal axis.

2. The filter housing of claim 1, wherein the cartridge-receiving section and the cover-receiving section of the peripheral wall are cylindrical, a diameter of the cover-receiving section greater than a diameter of the cartridge-receiving section.

3. The filter housing of claim 1, wherein the lubricant outlet and the portion of the cover-receiving section are circumferentially aligned with a location where the radial dimension of the shoulder is maximal.

4. The filter housing of claim 1, wherein the lubricant outlet defines an exit flow axis having a radial component relative to the longitudinal axis.

5. The filter housing of claim 4, wherein the exit flow axis further has a circumferential and/or an axial component relative to the longitudinal axis.

6. The filter housing of claim 1, wherein a cross-sectional area of the filter housing taken along a plane normal to the longitudinal axis is greater at the cover-receiving section than at the cartridge-receiving section.

7. The filter housing of claim 1, wherein a circumferential length of the portion of the cover-receiving section relative to the longitudinal axis equals to or is greater than a dimension of the lubricant outlet in a circumferential direction.

8. A filter assembly comprising: a housing having a peripheral wall extending around a longitudinal axis and end wall secured to the peripheral wall, the housing defining a cavity partially enclosed by the peripheral wall and the end wall, the peripheral wall defining a first section extending from the end wall along the longitudinal axis and a second section extending along the longitudinal axis from the first section toward an open end of the housing opposed to the end wall, a circumferential portion of the second section extending radially beyond the first section relative to the longitudinal axis, the housing defining a lubricant outlet defined through the peripheral wall at the circumferential portion of the second section; and a cover at least partially received within the housing and sealingly engaged to the housing, the cover defining an internal passage communicating with the lubricant outlet, a central axis of the second section being radially offset from a central axis of the first section.

9. The filter assembly of claim 8, wherein the peripheral wall is cylindrical, a diameter of the peripheral wall at the second section greater than a diameter of the peripheral wall at the first section.

10. The filter assembly of claim 9, wherein the circumferential portion registers with a location where a radial distance between the first section and the second section is maximal.

11. The filter assembly of claim 10, wherein the lubricant outlet defines an exit flow axis having a radial component relative to the longitudinal axis.

12. The filter assembly of claim 11, wherein the exit flow axis further has a circumferential and/or an axial component relative to the longitudinal axis.

13. The filter assembly of claim 10, wherein the cover is in abutment against an abutment face defined by the peripheral wall at an intersection between the first section and the second section.

14. The filter assembly of claim 13, wherein a sealing engagement is created by a sealing member sandwiched between the cover and the peripheral wall.

15. The filter assembly of claim 14, wherein the sealing member is received within an annular groove circumferentially extending around the longitudinal axis, the annular groove facing a direction having a radial component relative to the longitudinal axis.

16. The filter assembly of claim 15, wherein the housing has a peripheral flange protruding at least radially outwardly from the second section of the peripheral wall proximate the open end of the housing, the peripheral flange detachably securable to the cover.

17. The filter assembly of claim 10, wherein a cross-sectional area of the housing taken along a plane normal to the longitudinal axis is greater at the second section than at the first section.

* * * * *